Nov. 30, 1937.  H. A. TRUSSELL  2,100,676
FUEL SYSTEM FOR COMBUSTION ENGINES
Filed March 23, 1933  6 Sheets-Sheet 1

INVENTOR:

Fig. 8.

Nov. 30, 1937.   H. A. TRUSSELL   2,100,676
FUEL SYSTEM FOR COMBUSTION ENGINES
Filed March 23, 1933    6 Sheets-Sheet 5

INVENTOR.
Homer A. Trussell

Patented Nov. 30, 1937

2,100,676

UNITED STATES PATENT OFFICE 2,100,676

FUEL SYSTEM FOR COMBUSTION ENGINES

Homer A. Trussell, Detroit, Mich.

Application March 23, 1933, Serial No. 662,399

34 Claims. (Cl. 123—119)

This invention relates to combustion engines, and more particularly, to a new and useful fuel system for such.

The invention has as its objects the improving of efficiency, power, cooling, flexibility, starting, subnormal temperature operation, and longevity, particularly in systems where difficult conditions such as are encountered in "cold carburetion" exist; by providing for the formation and delivery of the working fluid with precision according to engine operating requirements, with low working fluid temperatures, and in large quantities when needed if the engine be warm enough.

Further objects are to accomplish the foregoing in a system which may have a variable ratio feed comprising a plurality of working fluid portions formable in a great range of characteristics including the extreme of air only, in one, and a rich mixture in another; which may feed a rich portion with high velocity particularly while low operating temperatures exist or while small quantities are being used or while the engine is being accelerated; which may automatically adjust the mixture strength for variations in temperature, in altitude, atmospheric pressure or forced draft pressure, in engine speed for given throttle openings and in acceleration demands. Still further objects are to accomplish the change from one fuel-air ratio to another in a system of this type in such a manner as to assure smooth efficient operation; to make such a system applicable to forced draft feeding; to provide a system which may limit the throttle opening thermodynamically to protect the engine from being forced beyond predetermined outputs for given temperatures; and which may operate without provision for heating but at the same time without loading or unequal distribution, and which may operate with leaner mixtures without misfiring.

It is contemplated that the system may be applicable to downdraft, updraft, or crossdraft feeding without permitting of puddling of fuel or subsequent purging of it into the combustion chambers, a condition so frequently encountered in many conventional systems despite their use of excessive heat, undersized passages and other makeshifts, which shortcomings are obviated by my invention.

These and other objects made apparent in the further description of this invention are accomplished by means of the fuel system herein, the better understanding of which is made possible by reference to the drawings, in which.

Figures 1, 2:
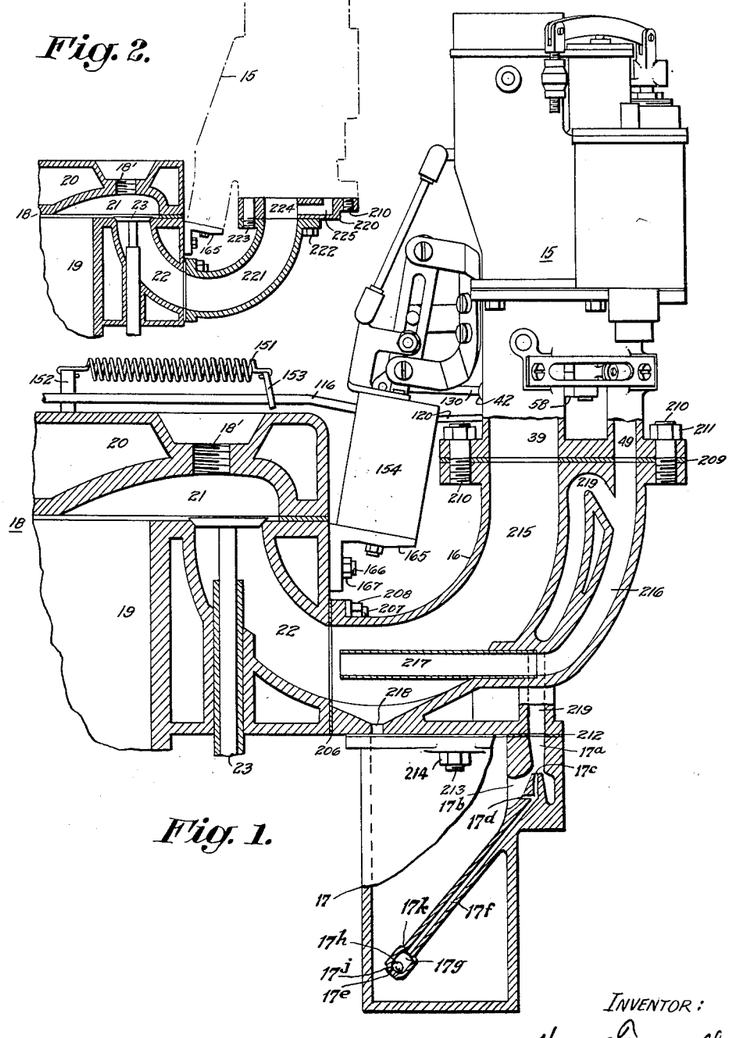
Fig. 1 illustrates an application of the system to a combustion engine for initial delivery of working fluid in one or two portions adjacent the conventional junction point of the induction conduit and the intake port, and including reclaiming of liquid fuel in a manner in which it may be applied to any modification of this system having a portion so situated as to accumulate liquid fuel particles.
Fig. 2 illustrates an application of the system to a combustion engine for delivery of working fluid in one or two portions adjacent the conventional point of entry to the induction conduit, the carbureting portion being shown in dot and dash lines.

Referring now to the drawings, Fig. 1, the system comprises an initial carbureting portion 15, induction member 16, reclaimer 17, and the combustion engine 18, the engine comprising a cylinder block 19 having a cylinder head 20, a combustion chamber 21, an inlet port 22 and an inlet valve 23. The carbureting portion generally designated as 15 (Fig. 6) has a lower main body portion 24 and an upper main body portion 25 secured together by the bolts 26 and having the gasket 15' interposed between these portions. The lower portion has a circular fillet 27 fitted into the counterbore 28 in the upper portion at the base of the circular bore 29 extending upward to 30 at which point the air conduit 31 joins 29 so that air may be supplied to the passages 32 and 33 formed in 29 by the extension 34 of the lower portion.

A butterfly valve 35 (Fig. 6) is supported by the shaft 36 pivotably mounted in the wall of 31 in 25 and carries the actuating lever 37. Conduit 31 has its inlet designated as 31'. The extension 34 rises from the top of the fillet 27, is substantially semi-circular and fits the bore 29 so that when it is inserted therein and the two portions 24 and 25 secured together, it divides 29 so that air may pass on one side of 34 to 32 and on the other side of 34 to 33. Elements 27, 28, 29, and the semi-circular wall of 34 are concentric to each other. The inclined wall 38 of the lower portion merges the semicircular passage 32 with the cylindrical passage 39 containing the butterfly valve 40 supported by the shaft 41 which is pivotably mounted in the wall of 39 in 24 and carries the actuating lever 42.

A venturi 43 (Fig. 6) is secured in the cylindrical bore 44 of 34 by the screw 45 and is adapted to receive air from 33. The tubular valve 46 is mounted in the bore 44, which extends downwardly to about the center of the main part of the lower portion, so it may oscillate therein to throttle fluid passing through its opening 47 into the port 48 connecting with the passage 49 in 24. The opening 47 is square and the port 48 is rectangular so that a fixed ratio of opening for each degree of oscillation while allowing for various elevations of 46 may be provided. While opening 47 and port 48 are shown as square and rectangular respectively, it is apparent that any desired shape or shapes of these openings may be employed. Port 48 is closed at its lateral extremity opposite to the valve 46 by the plug 50. The slot 51 in 34 surrounds the lower end of 43 and the upper end of 46 and connects the aperture 52, which may be formed between these last two members, to passage 32.

Figures 9, 10:
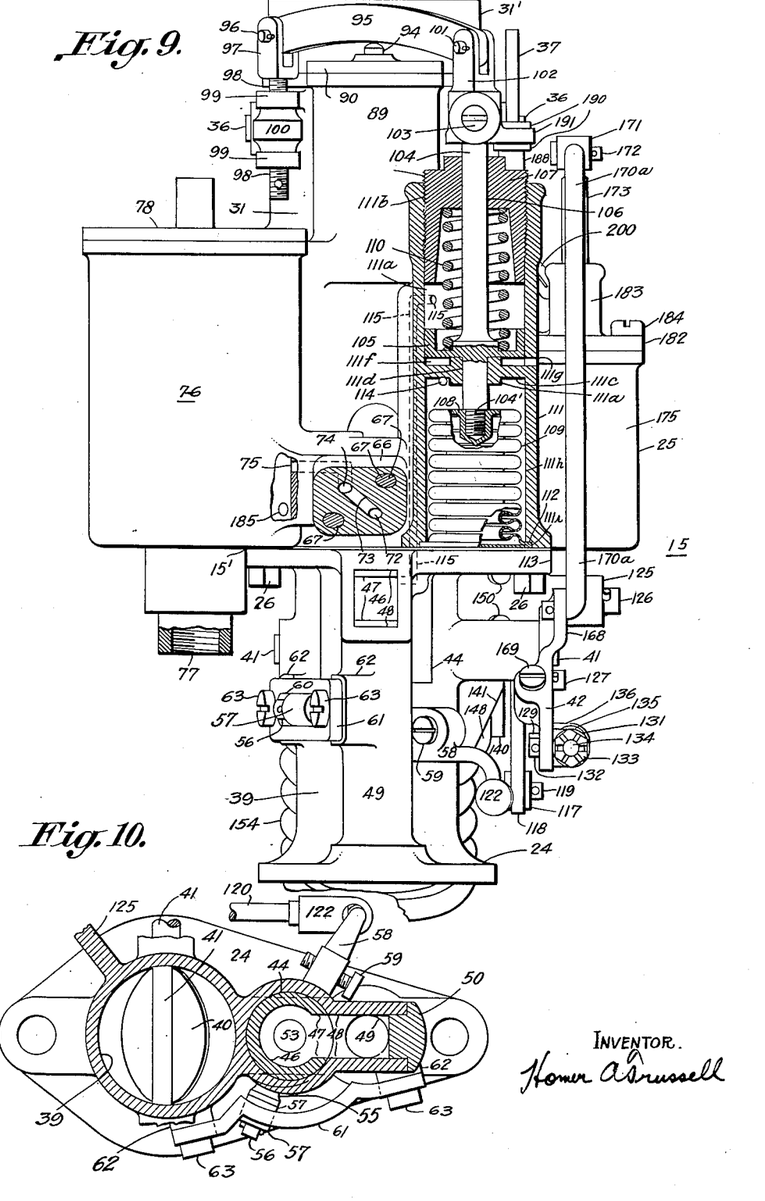
Fig. 9 is an end view, partly in section, of the carbureting portion indicated by 9 of Fig. 8, but with the port plug 50 removed.
Fig. 10 is a horizontal section of Fig. 6, taken at about line 10 and looking in the direction of the arrow.

Shaft 53 (Fig. 6) is fastened in valve 46 and the actuating member 54, which has the roller arm 55 with its journal 56 in the roller 57, ball arm 58 and stop screw 59. This roller 57 may swing in the slot 60 formed in the plate 61 which is adjustably held to the lower body portion lugs 62 by the screws 63 passing through the elongated holes 64 in 61, it being possible to thereby obtain various elevations of 46 at the various angular positions of 56. The fuel supply jet 65 has a flanged base 66 (Fig. 9) secured to 25 by the screws 67, and is upwardly inclined through the hole 68 in 25 (Fig. 6), the hole 69 in 34 and the hole 70 in 43, so that fuel may be delivered through the aperture 71 at about the center of venturi 43. Fuel may be fed to 71 through the passages 72 in 65, 73 and 74 in 66, and 75 in 25, from the fuel supply chamber 76 (Fig. 9), which is not shown in detail because the method of maintaining the supply therein is not considered part of this invention. Chamber 76 has a fuel inlet 77 and a cover 78.

The automatic air valve 79 (Fig. 6) has a grooved portion 80 pivotably mounted on the journal portion 81 of 34 and the arm 82 carrying the wrist pin 83, and is fitted to 81 and to the bore 29 so it may be caused to swing toward 34 by air passing into 32. The connecting rod 84 engages 83 and has the ball 84' at its upper end for engagement with the dash pot piston 85 which has the socket 86 to receive 84' and the hole 88 which may be employed to allow rapid return of 85 if 84' and 86 tend to separate. The dash pot 89 is a cylindrical bore in 25 open to 31 at the bottom and closed at the top by cover 90 secured by threads 91. The piston 85 may have a hole 87 to equalize pressure above and below the piston and this hole may be of any desired size to govern the resistance offered to the movement of this piston.

The air valve spring 92 (Fig. 6) has its upper end on the adjustable seat 93 secured to the shaft 94 protruding through the cover 90, and its lower end engaging the piston 85, thereby tending to keep the valve 79 closed. Spring 92 holds the shaft 94 up against the center of the bar 95 which is supported at one end by the clevis pin 96 in the adjustable clevis 97 having the threaded portion 98 passing through the lugs 99 on 25, and having the adjusting nut 100 located between these lugs and engaging the threads 98, and supported at the other end by the clevis pin 101 in the clevis member 102 secured to the economizer piston rod 104 by the screw 103. Economizer control piston 105 (Figs. 6 and 9) is shown integral with the rod 104 having the portion above the piston in the guide 106 in the member 107, and having a portion below the piston threaded at 104' to engage the threaded recess 108 in the upper end of the air-tight bellows 109; and a spring 110 between 105 and 107 may be employed to tend to keep the piston and the rod 104 down.

Figures 6, 7:
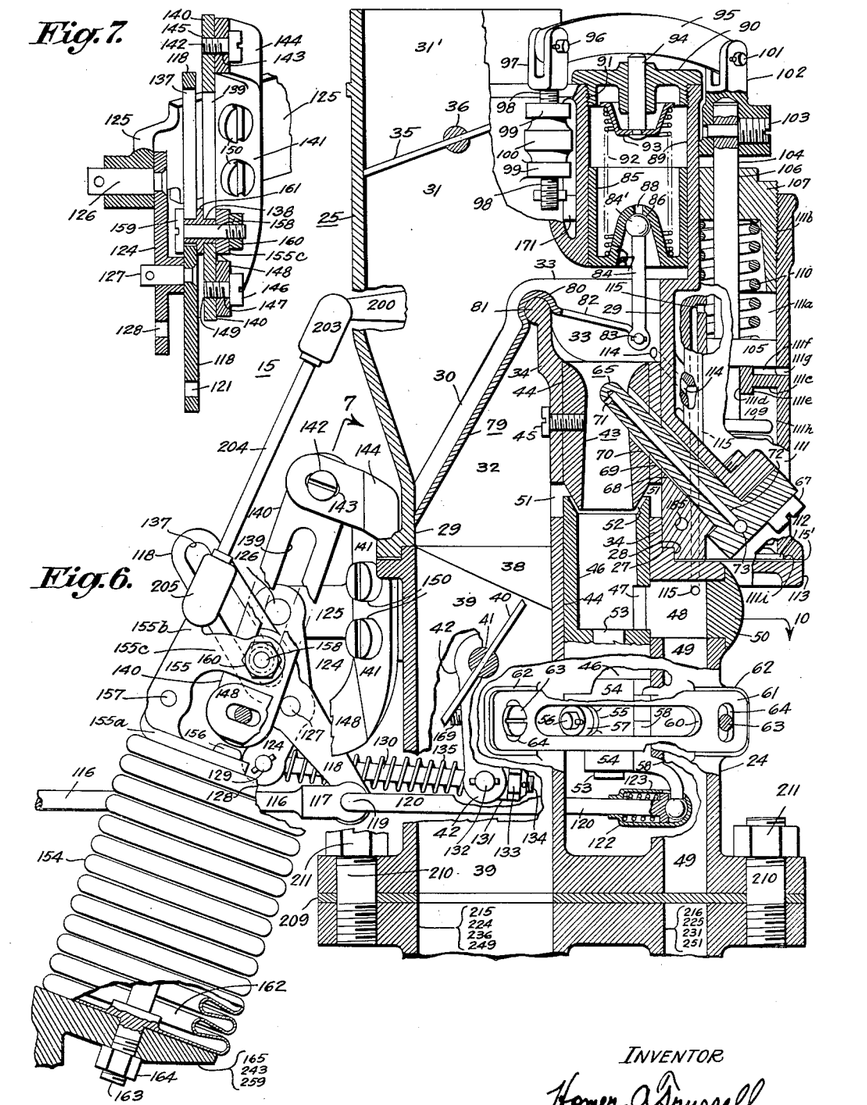
Fig. 6 is a view in longitudinal section of the initial carbureting portion of the system in conjunction with a fragment of an induction member, showing how some of the elements may be arranged.
Fig. 7 is an enlarged end view of the variable ratio throttle control taken generally on the line 7 of Fig. 6, looking in the direction of the arrow, and showing the parts in a low throttle position.
Figure 11:
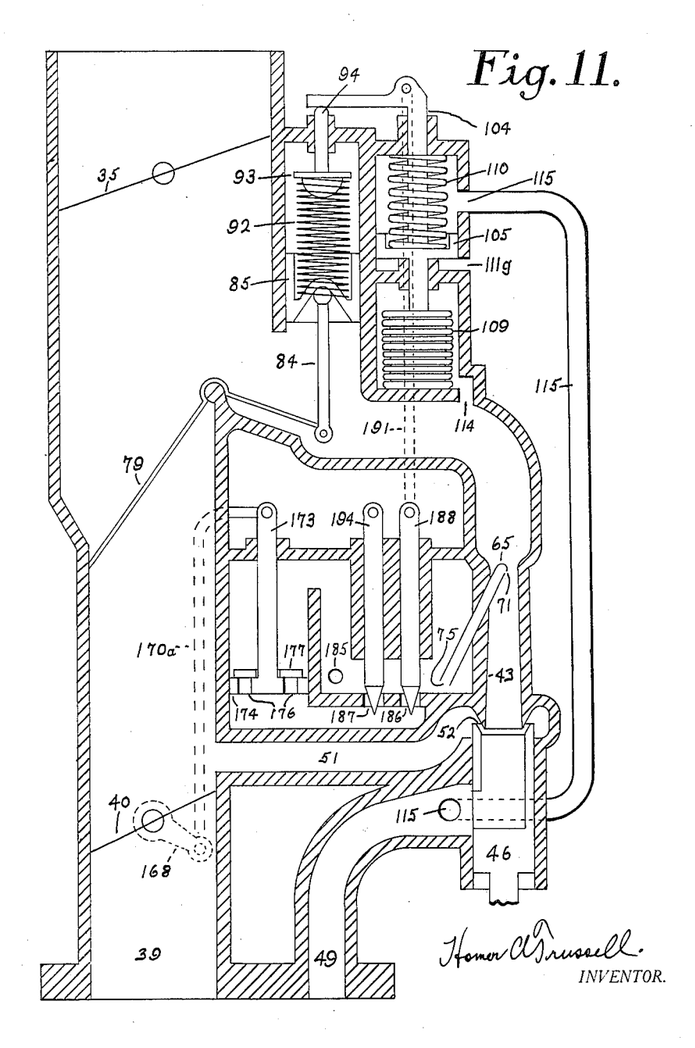
Fig. 11 is a diagrammatic view showing the various parts of my invention in their functional relation, rather than actual construction.

Cylinder 111 in 25 (Figs. 6 and 9) has the upper cylinder bore 111a, in which the piston 105 is adapted to reciprocate; the threads 111b to receive the member 107 which also serves as the cover for 111a and as an adjustable seat for the spring 110; the intermediate wall 111c having the guide 111d in the boss 111e for the lower portion of the rod 104 and forming a chamber 111f beneath the piston 105; the apertures 111g connecting 111f with the atmosphere; and the lower cylindrical bore 111h housing the bellows 109 which has the flange 112 in the counterbore 111i and seats on the extension 113 of 24 which forms the bottom of 111h. The top of boss 111e may gauge the lowermost position of the piston 105, and the bottom of 111e may gauge the uppermost position of the bellows 109. The passage 33 and 111h are connected by the duct 114; and the port 48 and 111a are connected by the duct 115 (Figs. 6 and 11).

The variable throttle control has a control rod 116 (Figs. 6 and 8) with its clevis end 117 hinged to the arm 118 by the bent end 119 of the throttle rod 120 passing through 117 and the hole 121 in the lower end of 118. 120 is connected at its other end to the ball on arm 58 by a socket comprising the housing 122 and the spring 123 holding the ball against the flanged end of 120, it being thereby possible to directly actuate 120 by 116 and at the same time impart motion to 118. Arm 124 is supported on the extension 125 of 24 (Figs. 6, 7, and 8) by the shaft 126 journaled therein and secured to 124, and receives the shaft 127 which is secured to 118 for support thereof and has the hole 128 in its lower end for engagement of the journal portion 129 of the rod 130 connected at its opposite end to the arm 42 by means of the slip joint comprising the guide 131 having the journal portion 132 carried in the lower end of 42; the castellated nut 133 on the threaded end 134 of 130; and the spring 135 seated at one end on 131 and at the other end on the flange 136 of 130. Arm 118 has a slot 137 in its upper part above 127, and this slot engages the flanged bushing 138 which also is engaged by the slot 139 in the guide plate 140 adjustably held at its upper end to the bracket 141 by the screw 142 passing through the elongated hole 143 in the upper arm 144 of 141 and engaging the threads in the hole 145 in the upper end of 140, and at its lower end to 141 by the screw 146 passing through the elongated hole 147 in the lower arm 148 of 141 and engaging the threads in the hole 149 in the lower end of 140. The bracket 141 is secured to 125 by the screws 150 threaded therein, the foregoing arrangement making it possible to impart motion to 124 by movement of 118. A spring 151 (Fig. 1) anchored to the lug 152 of the engine 18 and connected by the adjustable clip 153 to 116 tends to hold 118 and 124 in low throttle position.

The ratio of movement of arms 118 and 124 may be varied by a change in the elevation of the bushing 138 (Fig. 7) which is adapted to slide in 139 so it may provide a variable fulcrum for 118. The air-tight bellows 154 (Fig. 6) has its upper end secured by the rivet head 156 to the foot 155a of the connecting member 155 having the ball arm 155b and the flanged arm 155c which is connected to the bushing 138 by the bolt 158. Bushing 138 is secured between the head 159 of the bolt 158 and the arm 155c by the nut 160 on the bolt 158 passed through the bushing center and the hole in 155c. The flange 161 on 138 (Fig. 7) between 118 and 140, the bolt head 159, and the arm 155c maintain spaced relation of 118 and 140, and operating clearance for 118 and 138. The bellows 154 may contain fluid 162, and is secured by the stud 163 and nut 164 to the bracket 165 fastened to the engine 18 by the studs 166 and nuts 167 (Fig. 1).

Throttle arm 42 (Fig. 8) is bifurcated to form the upper arm 168 and has its lower portion threaded to receive the stop screw 169. The lug 170 on 125 is a rest for 169. A hole in the outer end of arm 168 receives the bent lower end of the connecting rod 170a, which has the clevis 171 at its upper end carrying the clevis pin 172 to connect it with the upper end of the piston rod 173 of the dash pot piston 174 adapted to reciprocate in the dash pot 175. The piston 174 has the holes 176 through it and the disc valve 177 resting on it and covering these holes. The dash pot 175 is a cylindrical bore in 25, open at its lower end to passages 178 and 179, open at its upper end to passages 180 and 181, and having a cover 182 which is secured to 25 by the screws 184, and which provides the guide 183 for 173. The passage 180 is connected to the fuel supply chamber 76 by the passage 185, and may be connected to 178 through the aperture 186; and the passage 181 may be connected to 179 through an aperture 187.

Valve 188 (Figs. 8 and 11) is supported in the guide 189 in 25, has the flanges 190 at its upper end engaged by the forked extension 191 of the clevis member 192, and has the reduced round portion 192 at its lower end for operation in 186 cut to wedge shape at 193. Valve 194 is supported in the guide 195 in 25, is slotted and drilled at its upper end to receive the link 196 and the pin 197, which also passes through the link, and has the reduced round portion 198 at its lower end for operation in 187 cut to wedge shape at 199. The upper end of the link 196 is connected to the arm 200 by the pin 201 passed through both, this arm being supported at one end by the shaft 202 mounted in 25, and at its outer end has a ball engaged by the socket 203 on the upper end of the rod 204, the socket 205 on the lower end of which rod engages the ball on the arm 155b.

Induction member 16 (Fig. 1) is secured to the engine 18 with the gasket 206 interposed by the studs 207 and nuts 208; has the carbureting portion 15 secured to its upper face with the gasket 209 interposed by the studs 210 and nuts 211, and the reclaimer secured to its lower face with the gasket 212 interposed by the studs 213 and nuts 214. Conduit 215 establishes communication between 39 of 15, and 22 of 18; the conduit 216 establishes communication between 49 of 15 and the tube 217, which has one end secured in 16 and the other end terminated in 215 adjacent the outlet thereof (Fig. 1). The aperture 218 is in the lowest part of 16 and connected with reclaimer 17 so that liquid may drain from 215 into 17; and the duct 219 connects 17 with 216 so that fluid may pass from 17 through 217. To this end, reclaimer 17 is formed with the venturi 17a, having an inlet 17b, and a fuel jet 17c. A bleed 17d communicates with 17c for the purpose of assisting fuel control, and a fuel duct 17f likewise communicates with 17c, said duct projecting downwardly towards the lower portion of the reclaimer and having a fuel inlet 17e. Adjacent said inlet is a ball operating channel 17g in which is disposed a ball 17h, said ball seating at 17j in such a manner as to prevent fuel from draining down and out of duct 17f. In the upper portion of channel 17g, ball 17h seats at point 17k for the purpose of withholding fuel from 17f in order to prevent a surge of fuel delivery upon a sudden increase of suction in 219. An ignition plug may be installed in the threaded hole 18' in the head 20.

The arrangement shown in Fig. 2 is substantially the same as in Fig. 1 except that the elements between 15 and 18 are different, induction member 16 being replaced with the adapter 220 and the induction conduit 221, secured together with bolts 222 and having an elongated stud 223 in place of one of the studs 210.

Further referring to Fig. 2, it will be seen that the adapter 220 has the passage 224 connected with 39 of 15, and has the passage 225 connecting 49 of 15 with 224. The induction conduit 221 establishes communication between 224 and 22 of 18.

Figures 3, 4, 5:
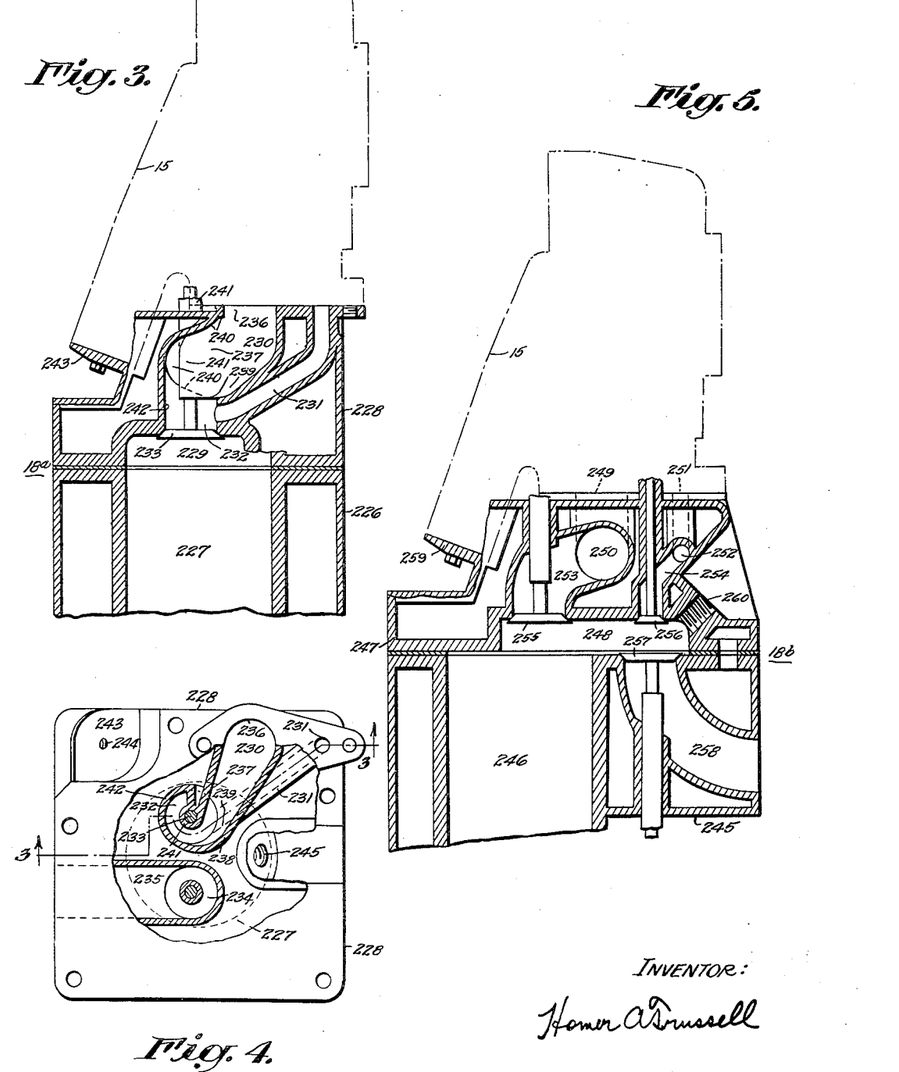
Fig. 3 illustrates an application of the system, generally on line 3 of Fig. 4, looking in the direction of the arrows, to a combustion engine for delivery of the working fluid in one or two portions adjacent the inlet to the combustion chamber, the carbureting portion being illustrated in dot and dash lines.
Fig. 4 is a top plan view of the cylinder head shown in Fig. 3, the view being partly in section and showing how some of the parts may be arranged.
Fig. 5 shows an application of the system to a fragment of a combustion engine, with provision for independent delivery of two working fluid portions directly to the combustion chamber, the carbureting portion being indicated in dot and dash lines.

The arrangement shown in Figs. 3 and 4 has the carbureting portion 15, which is substantially the same as shown for Fig. 1, mounted on the head of the engine 18a, said engine comprising a cylinder block 226 having the cylinder bore 227 and the cylinder head 228 with a combustion chamber 229; along with inlet conduits 230 and 231, an inlet port 232, an inlet valve 233, an exhaust valve 234 and an exhaust port 235. Conduit 230 connects the passage 39 (Fig. 1) of 15 with the port 232 (Fig. 3) and has an upright circular portion 236 at its inlet merging into a substantially rectangular portion having the side walls 237 and 238, the bottom 239, and the top 240. The wall 237 terminates at the valve guide 241; the wall 238 continues on in a curve to join the upright circular wall 242 of 232 (Fig. 4); the bottom 239 declines and terminates at a portion of the top of 242 between 237 and 238; the top wall 240 continues on between 241 and 242, becoming the top of 232, and then declines in a spiral terminating on a level with the junction of 239 and 242. Conduit 231 (Fig. 3) connects the passage 49 (Fig. 1) of 15 with the port 232 and terminates in 242 underneath 239 and between 237 and 238. Flange 243 (Fig. 6) provided on 228 supports the bellows 154 and has a hole 244 to receive the stud 163. An ignition plug (not shown) may be installed in the threaded hole 245 in 228 (Fig. 4); and the spring 151 (Fig. 1) may be anchored at any convenient point to tend to move the arms 118 and 124 toward low throttle position.

The arrangement shown in Fig. 5 has the carbureting portion 15, which is substantially the same as that shown in Fig. 1, mounted on the head of the engine 18b, said engine comprising the cylinder block 245 having the cylinder bore 246 and the cylinder head 247 with a combustion chamber 248; along with inlet conduits 249 and 251, inlet ports 253 and 254, inlet valves 255 and 256, an exhaust valve 257, and an exhaust port 258. The conduit 249 connects with the passage 39 of 15, and has its lower portion 250 open to the port 253, the valve 255 seating at the junction of 248 and 253; and the conduit 251 connects with the passage 49 of 15, having its lower portion 252 open to the port 254, the valve 256 seating at the junction of 248 and 254. The portion 259 of 249 and the portion 252 of 251 are substantially horizontal and may serve to feed another combustion chamber. The flange 259 is provided on 247 for the purpose of supporting the bellows 154; an ignition plug (not shown) may be installed in the threaded hole 260 in 247; and the spring 151 may be anchored at any convenient point to tend to move the arms 118 and 124 toward low throttle position.

The operation of the system as shown in the drawings, and in an otherwise conventional automobile installation, referring first to the initial carbureting portion since it is substantially the same in each of the arrangements, is as follows:

The bellows 154 (Fig. 6) may contain enough fluid sufficiently volatile and have a suitable internal pressure for it to be contracted at low temperature at low altitude and hold the bushing 138 down against the bottom of the slot 139 in 140, and to expand at high temperature at high altitude to hold 138 up against the top of 139, and to provide intermediate positions of 138 at intermediate temperatures and/or altitudes.

Figure 8:
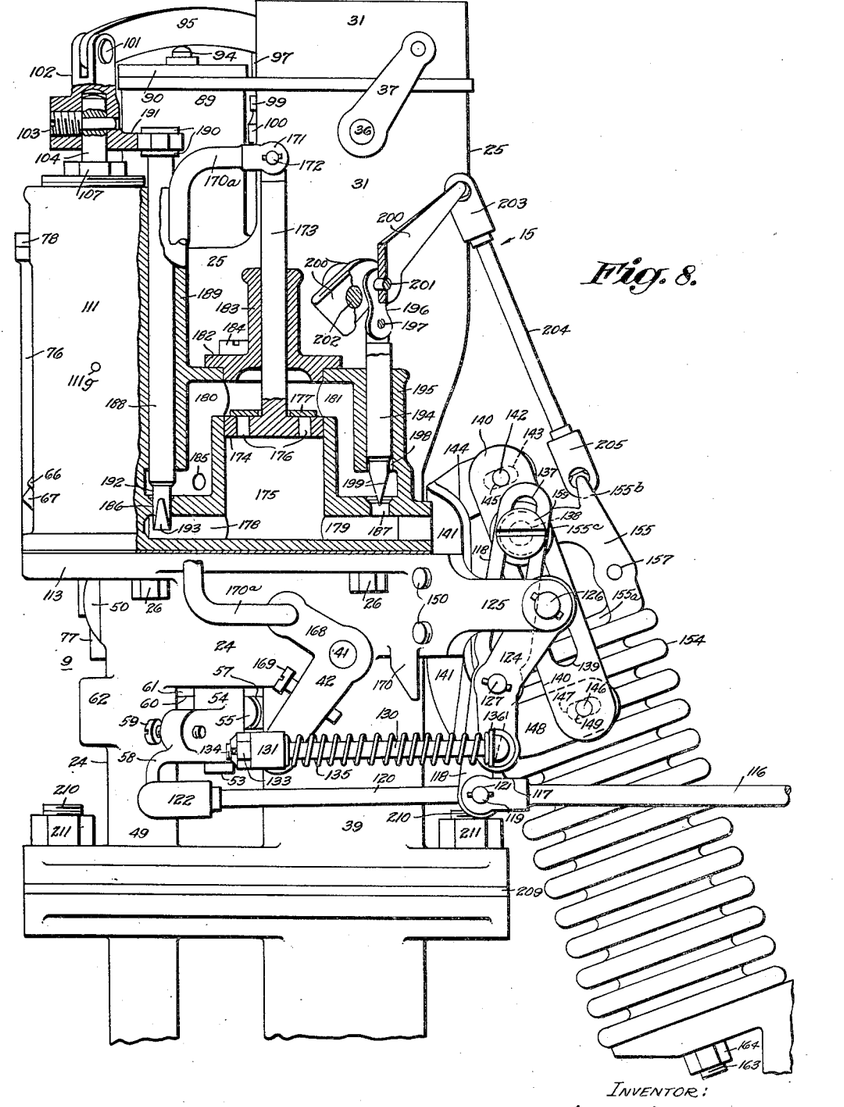
Fig. 8 is a view in perspective, partly in section, showing the opposite side of Fig. 6, the variable ratio throttle control being in position for full volume delivery.

The degree of opening of the valves 40 and 46, disregarding the action of the dash piston 174, may be controlled by the position of the rod 116, the elevation of the bushing 138, the angle, position and shape of the slot 139 in 140, and/or the adjustment of the stop screws 169 and 59. Either of these valves may close and the other remain partly open, or both may close or both may remain partly open, if these stop screws be set accordingly, for low throttle position with 116 released. In the following description, "independent low position" of either of these valves is intended to mean the minimum opening from zero up, permitted by the actual adjustment of the governing stop screw; and "low position" is intended to mean the independent low position or the low permitted by the actual position of the arms 118 and 124 with the rod released, as the case may be. Valves 40 and 46 may be permitted to be in their independent low positions at the various elevations of the bushing 138 with the rod 116 released, by having the plate 140 with the slot 139 formed straight and in a position so that its center-line coincides with the center-line of the arm 118, generally as shown in Figs. 1, 6, and 8. The valve 40 may then be opened to another low position by moving the slot 139 to the right (see Fig. 6), and, subsequently, moving the bushing 138, the upper end of the arm 118, the shaft 127, the lower end of the arm 124, the rod 130 and the lower end of the arm 42 to the right, the pull of the spring 151 tending to keep the lower end of 118 to the left; or the valve 46 may be opened to another low position by moving the slot 139 and the bushing 138 to the left so the upper end of 118 may swing to the left around the shaft 127 and the lower end to the right, in which case the arm 124 will not swing to the left because the valve to which it is connected is in its independent low position.

Plate 140 may be adjusted laterally at its lower end so that while the bushing 138 is down and the rod 116 released, these valves may be in their independent low positions, or so that either one may be in its independent low position and the other open to another low position. The plate 140 may also be adjusted at its upper end so that while the bushing 138 is up and the rod 116 released, these valves may be in their independent low positions, or so that either one may be in its independent low position and the other be open to another low position. With the rod 116 released, both of these valves may be in its independent low position; or either one of the valves may be in its independent low position while the other may be open to another low position at any given elevation of the bushing 138, according to the lateral position of the slot 139 at this elevation. The ratio of opening of these valves may be maintained, reduced, increased or reversed with a change in the elevation of the bushing 138, according to the angle, position and shape of the slot 139 in 140 and the adjustment thereof.

The ratio of opening of valves 40 and 46, disregarding the variation obtainable with 140, at various given positions of the rod 116, may be altered by altering the proportions of parts of the throttle control. In Fig. 6, for example, this control is proportioned so that the valve 40 may be about half open while the valve 46 is wide open, with the bushing 138 down, and so that the valve 40 may be substantially wide open while the valve 46 is wide open with the bushing 138 up (as in Fig. 8). The ratios of opening of the valves 40 and 46 may be altered as aforesaid; the ratio or volume obtainable through the passages 39 and 49 may also be altered as desired by having the sizes of the fluid conveying parts so proportioned; and the total fluid volume obtainable through the carbureting portion may be made large enough so that the total capacity thereof may not be needed except for operation at the maximum anticipated altitude, by fixing the fluid volume obtainable through either one or both of these passages accordingly.

For simplicity in the following description, one likely combination of adjustments is considered preferable, and it is assumed that the stop screws 169 and 59 are adjusted to allow the valves 49 and 46 to remain open to independent low positions considered desirable for the higher altitudes and temperatures; that the slot 139 is formed straight; and that the plate 140 is set to provide an increase in the opening of 46 as the elevation of the bushing 138 decreases. The variable-ratio throttle control of valves 40 and 46 may be supplied with a spring load, or its equivalent, applied to the elements gauging the elevation of the bushing 138, to assist in compensating for variations in air pressure and temperature and in resistance or friction of this control, and said spring may be adjustable.

Valve 46, (Figs. 6 and 10) oscillates to vary the opening between the hole 47 and the port 48, according to the movement of arm 58, and, as this valve oscillates, the aperture 52 may be maintained, reduced, nullified, produced or increased according to the elevation, angle, and/or shape of the slot 60. The aperture 52 may also be varied, nullified or produced with the valve 46 in any given angular position by varying the elevation of the slot 60, and any desired capacity of the aperture 52, from zero up, at a given angle of 46, may be provided for according to the elevation of the slot 60 at the point of contact of the roller 57 corresponding to this angle. As illustrated, slot 60 is straight, horizontal, and elevated to maintain the valve 46 at a point about half way between the limits provided for by the length of the slots 64 and the size of the port 48.

Bellows 109 (Figs. 9 and 11) may have a suitable internal pressure so that the piston 105 remains down until a predetermined pressure drop occurs in the port 48 and in the cylinder 111a at a given atmospheric pressure (temporarily disregarding the variations from atmospheric pressure in the passage 33 and the tension of spring 92), so the relatively higher pressure occurring in the bellows 109 in rarefied air may enable the piston 105 to rise to its various elevations at fewer degrees of pressure drop in the the port 48 as higher altitudes or lower air pressures are encountered. The bellows 109 may serve without the spring 110 if the bellows be of a suitable size with a suitable internal pressure, or the bellows may be employed to vary the tension of the spring 110 rather than to vary the tendency of the piston to rise against the load of the spring. The tendency of this bellows to increase its internal pressure upon an increase in temperature may be enhanced by employing volatile fluid therein and/or directly subjecting it to some heatable part of the engine.

An increase in the elevation of the piston 105 also tends to occur with an increase in working fluid volume due to the consequent pressure drop in the passage 33 and in the cylinder 111h, and to the increased tension of the spring 92 due to the increased opening of the valve 79. The cylinder 111h may be connected to the slot 51 or to any point between the inlet of the venturi 43 and the outlet of the valve 46 to increase the economizer action with an increase in the incoming fluid volume. An increase in the elevation of the piston 105 permits the center of the bar 95, the shaft 94 and the spring seat 93, to rise, and the spring 92 to reduce its tendency to close the air valve 79. It is understood that if forced draft be applied to the inlet 31', it may also be applied to the cylinder 111f, thereby supplanting atmospheric pressure therein with the pressure of the forced draft; and that 111f and 31' may be connected to compensate for a pressure drop that might be caused by a device such as an air cleaner or an intake muffler.

An increase in the opening of the valve 40 is accompanied by an increase in the elevation of the dash pot piston 174, (Fig. 8) and the rate of this increase may be governed by the elevation of either or both of the valves 188 and 194 varying the sizes of the apertures 186 and 187 respectively, permitting liquid to enter the cylinder 175 below 174. Closing of the valve 40 may be expedited by the valve 177 permitting liquid to escape from the cylinder 175 below 174 through the holes 176. The effective parts 192 and 198 of these valves may be of any desired shape, but the wedge shape shown is preferred because of the rate of increase in area of the openings provided therewith, upon an increase in the elevation of these valves. The valves may close and have any desired movement prior to the beginning of opening, or they may have any desired fixed opening with any desired movement prior to the increasing of the opening, and in either case, may have any desired rate of increase upon an increase in elevation of the governing elements.

In starting the engine, valve 35 (Figs. 6 and 11) may be closed to reduce pressure in passage 31 and increase the flow of fuel at the aperture 71 of the jet 65. Operation throughout a wide range of temperatures may be accomplished without the use of the valve 35 to restrict the supply of air to the passage 31, but if the engine be operated with the valve 35 partially open, the economizer control may tend to keep the working fluid from becoming overrich, by permitting a larger portion of the incoming air to pass into the passage 32 rather than through the venturi 43, at a relatively slower engine speed for a given throttle opening, due to the earlier drop in pressure in the passage 33.

The passages 111g, 114, and 115 (particularly the latter) (Figs. 6 and 9) may be varied in capacity by valves or otherwise, to vary the rate of movement of the piston 105, and this feature may be employed to vary the interval in which the snubbing force of the piston 174, during acceleration, may be affected by the elevation the valve 105 may have attained just prior to acceleration; or a valve capable of completely closing one or more of these passages may be employed to keep the piston 105 from rising during starting, low throttle operation, or at any other time. The valve 35 may be eliminated and some other provision made for low temperature starting, such as shifting the lower end of the plate 140 to increase the opening of the valve 46 and shifting the low throttle end of the plate 61 to restrict or eliminate the aperture 52, if such alteration is deemed advisable with a given engine.

As the engine speed for a given throttle opening increases, pressure drops in the port 48 and in the cylinder 111a, and, at a predetermined pressure drop for a given atmospheric pressure the piston 105 may start to rise. An increase of this differential in these pressures may cause this piston to rise higher and decrease the ratio of fuel to air in the working fluid. In this manner, the economizer action, which is very advantageous during light running, may be accomplished. The induction pressure drop at which economizer action is desirable is less at higher intake throttle openings and then the piston 105 may be further aided to float by subjecting the bellows cylinder 111h to the then reduced pressure in the passage 33 through the duct 114, which action is still further aided by the increased tension of the spring 92 concurrent with an increased intake volume. The ratio of atmospheric pressure to induction pressure at which economizer action is desirable, and the fuel to air requirements, reduce as atmospheric pressure reduces, and again, the piston 105 may be further aided to float by subjection of the cylinder 111h to the reduced pressure in the passage 33 concurrent with reduced atmospheric pressure.

The adjusting member 107 (Fig. 6) may be employed to vary the occurrence of the economizer action, and the adjusting nut 100 may be employed to vary the fuel-air ratio. A variation in the elevation of the clevis 97, and consequently in the tension of the spring 92, may be accomplished by turning the nut 100. An increase in the incoming air volume may cause an increase in the opening of the valve 79, and the dash pot piston 86 may be employed to retard the movement of this valve at this time to enrich the working fluid temporarily and to steady the action of this valve. The volume of working fluid available to the engine may be increased by pushing the rod 116 toward the carbureting portion 15, and the ratio and relative movement of the valve 40 to the valve 46 may be controlled by the elevation of the bushing 138, the rate of motion of the rod 116, and the resistance offered by the piston 174. The tension of spring 135 is considered as a constant factor, although various tensions may be provided for by adjusting the nut 133, or even replacing the spring with another of different elastic force when conditions warrant. A control may be used to provide a variable ratio of stroke of 174 to degree of opening of valve 40, if such is deemed desirable.

The ratio of fuel to air required becomes lower as atmospheric pressure reduces or as temperature increases, and this pressure change may be met by a fuel-air ratio control operable by a pneumodynamic element; the temperature change may be met by a control operable by a thermodynamic element; and either change may be met by a control variable at the will of the operator. It is preferred herein to have the control for this purpose operable by what might be termed a pneumatic thermostat, as shown in the bellows 154, together with provision for remote operation at the will of the operator, as is suggested by the hole 157 in the connecting member 155. The fluid in the bellows 154 may be caused to expand, extend the bellows, and increase the elevation of the bushing 138 in response to changes in temperature and/or in the external pressure.

With the rod 116 (Figs. 6 and 8) released and the engine idling slowly, according to the setting previously specified, both valves may be open a small fraction, and air may pass through the venturi 43 from the passage 33 and receive fuel from the jet 65; air may be allowed to enter past the valve 79 with sufficient freedom to continue through the passages 32, 51, and 52 into the valve 46, with the fuel and air from the venturi 43 to feed the engine through the passage 49; and air may pass through the lower portion of the passage 39. An increase in the operating temperature of the engine and in the elevation of the bushing 138 now may result in a reduction in the volume and richness of the working fluid, due to the consequent reduction of opening of the valve 46. This variation in the volume of the working fluid is preferred under these conditions as an added precaution against the engine stalling while it is cold, yet permitting a slow idling speed while it is normally warm. With the rod 116 pushed toward the carbureting portion to "full throttle" position, the valves 40 and 46 may assume the positions shown in Fig. 6, if the altitude and temperature are low enough to have the bushing 138 down. In the figure, the valve 46 is shown wide open, and the valve 40 about half open. An increase in the temperature and/or altitude may cause an increase in the elevation of the bushing 138 and in the opening of the valve 40, and this valve may come to full open position and the variable ratio control assume the position shown in Fig. 8, if the increase in temperature and altitude become sufficiently great. An increase in the ratio of the opening 40 to 46 may reduce the fuel to air ratio of the working fluid by enabling a larger proportion of the air to pass through the passage 39. Intermediate positions of the rod 116 during intermediate atmospheric pressures and temperatures may result in relatively comparable actions and openings of the valve 40 and 46. The increasing of the respective openings of these valves throughout this range by pushing the rod 116 may be a continuous correlative action proportionately varied principally by the elevation of the bushing 138.

It is apparent that the foregoing action is subject to temporary alteration by the movement of dash pot piston 174 (Figs. 8 and 11). Valves 40 and 46 may be moved toward full open position from their low or intermediate positions by pushing the rod 116; and attain various ratios of opening for given positions of the rod according to the elevation of the bushing 138. If a change be made in the angle, location or shape of the slot 139 for low throttle work, which might disturb the fuel-air ratio of higher throttle positions, suitable correction may be made by altering the angle, elevation and shape of the slot 60. The portion delivered by the valve 40 may contain any desired proportion of fuel, or none at all, during any given phase of engine operation, depending upon the arrangement of the various parts of the carbureting portion, particularly the location and method of fuel introduction, the ratio of elevation to the angle of the valve 46, the fluid capacity of the venturi 43, the resistance offered by the air valve 79, the relative sizes of the passages 39 and 49, and the ratio of opening of the valves 40 and 46. One passage may be adapted to supply the primary working fluid independently, and this passage may be the larger one.

Further referring to the arrangement shown in Figs. 3 and 4, it is apparent that such provides for the delivery of two working fluid portions separately to the inlet port 232. The conduit 230 may deliver fluid from the passage 39 so that it tends to approach the outlet of the port 232 in spiral formation and to reduce intermingling of this fluid with fluid in the conduit 231; and the conduit 231 may deliver fluid from the passage 49 so that it circulates in this port 232 and tends to contact with the valve 233 and the port wall 242 and remain near the combustion chamber 229 rather than become diffused with the fluid in conduit 230.

Fluids from conduits 230 and 231 may circulate in the same direction and be stratified while they pass into the combustion chamber 229 and while they build up pressure against the head of the valve 233 during intervals between its openings; or fluid from either one of these conduits may be fed individually with increased precision. The termination of the induction conduits at the intake port may be so arranged as to assist in maintaining steady firing with lean mixtures, particularly if a large capacity induction system be used.

The arrangement shown in Fig. 5 provides for the delivery of two working fluid portions separately to the combustion chamber 248. Separate delivery of the working fluid portions from the passages 39 and 49 through individual valves to the combustion chamber provides for a distinctive method of charge formation, particularly in the combustion chamber, the flow of fluids to which is concentrated, equalized distribution made possible, and the intermingling of the working fluid portions at any point between the throttle valves and the combustion chambers prevented. The additional valve mechanism may be offset in multiple cylinder engines by using the single throttle valve and a simple, compact, induction conduit for each of these portions. The fluid fed past the valve 255 may enter the combustion chamber 248 at a relatively cool part with easy access to the cylinder 246, and tend to produce a denser charge; and the fluid fed past the valve 256 may enter the combustion chamber 248 at a relatively hot part and tend to become more easily ignited. Working fluid portions may be fed through the passages 39 and 49 and past the valves 255 and 256 respectively in ratio of volume and fuel-air content varied to take advantage of the operating characteristics of an engine with this method of working fluid induction.

The system is shown in the drawings in applications which may be made to single cylinder combustion engines, and as having two passages of different sizes for conveying fluid in one or two portions from the initial carbureting portion of the system for the subsequent formation of the working fluid charge. It is understood that this system may be applicable to all types of engines, including those having a plurality of combustion chambers and/or a common passage or any number of passages of any relative sizes for conveying fluid for charging a combustion chamber or chambers; that the working fluid portions may be united at any desired point for any type of engine; and that this fluid may be throttled in any desired manner at any desired place or places in any or all of these passages. In order to adapt this system to multiple cylinder combustion engines, the passages may be so arranged that the working fluid may be throttled in any or all of these passages at a point common to all of the cylinders; at points for each of the cylinders; or at points common to a plurality of cylinders less than the total number.

The initial carbureting portion of my system is shown in the drawings in a single fixed jet, air valve type, with characteristics described in detail elsewhere herein. It is understood that the fuel supply may be suitably arranged to conform to whatever form or application may be made of this invention; and it is further understood that the entire working fluid may be delivered in one, or any number of portions; that a plurality of carburetors may be used; that a plurality of carburetors may be combined with parts in common as desired; that individual fuel feeds may be used for each working fluid portion; that individual inlets for air of like or unlike temperatures for formation of working fluid portions may be used; and that one or any number of fuel feeds may be employed for each or a plurality of working fluid portions.

It is further apparent that other means than those shown may be used for temporarily enriching the mixture, as for starting or acceleration; that the fuel-air ratio alteration accomplished by any of the carburetor controls may be effected through control of the fuel feed either separately or in conjunction with control of the air feed; that the carbureting portion may be of a "plain tube" type with the economizer action accomplished by a variable fuel orifice and/or an air bleed aperture; and/or that pneumodynamic and/or thermodynamic units may be employed for adjustment of the fuel-air ratio through the medium of the ratio of throttle openings or otherwise and these units may be separated and arranged so that variation of this fuel-air ratio obtained is the result of the combined action of these two units. Starting may be further facilitated or the mixture enriching made fully automatic down to still lower temperatures with the control shown by adapting the thermal element for quicker response to the heat of combustion, permitting the valve 40 to close, reducing the size of the venturi and/or reducing or closing the aperture 52 with the aid of a simple element between the connecting member 155 and the plate 61 to have the valve 46 up while the bushing 138 is down.

The fuel reclaimer 17 is shown as being adapted to receive fuel from the larger induction passage adjacent the combustion chamber inlet and deliver it to the smaller induction passage adjacent its inlet, said reclaimer being designed, as previously stated, to receive fuel from induction systems where liquid fuel may accumulate and deliver it so that it reaches a combustion chamber in improved form, said systems having a plurality of passages to convey fluid for a combustion chamber. Fuel for reclaiming may be removed from any part or parts of any or all of a plurality of fluid induction passages for charging the combustion chamber or chambers and delivered to any part or parts of any or all of these passages by one or more reclaimers of any type for engines of any type and any number of combustion chambers; and the reclaimed fuel may be throttled and in any desired manner at any desired point or points. The reclaimed fuel may also be throttled and fed by the carburetor; and, if a working fluid portion be divided through a plurality of throttle controlled apertures for distribution to a plurality of combustion chambers, the reclaimed fuel may be likewise divided and/or throttled.

While I do not limit myself in so far as the exact structure of reclaimer 17 is concerned, I prefer to employ a device utilizing the principles disclosed in my Patent No. 2,016,352, October 8, 1935, Fig. 5 of the drawings of said patent illustrating a structure that may be readily adapted with the present invention.

Reclaimed fuel may be fed through a small passage adapted to feed a small portion of the working fluid from the initial carbureting portion, thereby utilizing part of the available capacity there-through, and reducing the fuel drawn from the carburetor while reclaimed fuel is being returned by displacing part of the fuel which otherwise might come through said passage from the carburetor.

While for the purpose of illustration only a limited number of forms of my invention have been set forth in detail herein, it is apparent that various other forms, applications, and arrangements of the device may be made without departing from the scope of the invention as set forth by the appended claims, which claims are to be given a construction as broad as is commensurate with my contribution to this art.

I claim:

1. In a fuel system for a combustion engine, downdraft feeding of the working fluid in a plurality of portions, updraft induction of the working fluid to the combustion chamber inlet, and conduits for said portions, said conduits being united adjacent the point at which said updraft induction begins, and a throttle valve adapted to control delivery of fuel and air to one of said conduits from an upright passageway below the point of initial vaporization of said fuel.

2. In a fuel system for a combustion engine, a device for forming the working fluid in primary and auxiliary portions, a conduit for conveying said primary portion, a conduit for conveying said auxiliary portion, and a reclaimer for receiving liquid fuel from said second conduit and delivering it through said first mentioned conduit.

3. In a fuel system for a combustion engine, means for forming the working fluid in two portions, a throttle valve for controlling the delivery of one of said portions, a valve for admitting air for the formation of said last mentioned portion, and a control providing for an adjustably variable rate of change of the ratio of opening of said valves, upon actuation of said throttle valve.

4. In a fuel system for a combustion engine, means for forming the working fluid in a plurality of portions, throttle valves for controlling the delivery of said portions, and means for retarding the rate of opening of one of said valves during their concurrent opening in the course of engine acceleration, and means for thermostatically controlling the amount of said retarding action.

5. In a fuel system for a combustion engine, a valve for admitting air for the formation of working fluid, means for varying the restriction offered by said valve to the admission of air, said means being governed by variations in atmospheric pressure and by variations in induction pressure.

6. In a fuel system for a combustion engine, means for enriching the working fluid for acceleration, and means governed by atmospheric pressure for adjusting the first mentioned means so that said enriching diminishes as the atmospheric pressure decreases.

7. In a fuel system for a combustion engine, a primary throttle valve, an auxiliary throttle valve, means governed by temperature and atmospheric pressure, for adjusting the working fluid mixture strength by varying the ratio of opening of said valves, said means reducing the strength of said working fluid as temperature increases or atmospheric pressure decreases.

8. In a fuel system for a combustion engine, a control governed by induction pressure and atmospheric pressure for adjusting the working fluid mixture strength, said control reducing such strength at predetermined ratios of induction and atmospheric pressures, said reduction beginning at higher induction pressures as the atmospheric pressure decreases.

9. In a fuel system for a combustion engine, a control governed by atmospheric pressure and induction volume for adjusting the working fluid mixture strength, said control reducing such strength upon a reduction of atmospheric pressure, or with an increase in induction volume.

10. In a fuel system for a combustion engine, means governed by induction suction and induction volume for adjusting the working fluid mixture strength, said means acting to reduce the strength of said mixture when predetermined ratios of suction and volume occur, the suction at which said reduction occurs becoming lower as the volume of the working fluid increases.

11. In a fuel system for a combustion engine, means governed by temperature for limiting the maximum of the throttled volume of the working fluid, so that said maximum is lower at low temperatures than at normal temperatures.

12. In a fuel system for a combustion engine, means for enriching the working fluid for purposes of acceleration, and means for diminishing said enriching as the ratio of engine speed to throttle opening increases.

13. In a fuel system for a combustion engine, two throttle valves for delivering the working fluid in two portions, a control for operating said valves simultaneously, and means for varying the working fluid mixture proportions by varying the ratio of opening of said valves, said means being governed by temperature and by induction suction.

14. In a fuel system for a combustion engine, means for adjusting the working fluid mixture strength so that it becomes reduced as the engine speed increases for a given throttle opening; and means governed by the induction volume for increasing the effectiveness of said first-mentioned means as said volume increases.

15. In a fuel system for a combustion engine, a main air inlet valve, a control to adjust said valve to vary the amount of air admitted thereby, and means governed by induction suction to actuate said control.

16. In a fuel system for a combustion engine, an auxiliary air inlet valve, a throttle valve engineward thereof, and means governed by pressure engineward of said throttle, to control said inlet valve.

17. In a fuel system for a combustion engine, an auxiliary air inlet valve, resilient means urging said valve toward closed position, so differential pressures on the respective sides of said valve affect the opening thereof, a throttle valve for controlling the engine speed, and means governed by atmospheric pressure variations to adjust said resilient means.

18. In a fuel system for a combustion engine, an air inlet valve, a control for varying the engine output, said control actuating said valve, and means governed by temperature and atmospheric pressure for varying the opening of said inlet valve by actuation of said control.

19. In a fuel system for a combustion engine, two conduits for delivering the working fluid components in two portions, a throttle valve in each of said conduits, a passageway for connecting said conduits on the influent sides of said valves, and means for varying the capacity of said passageway independently of the actuation of one of said valves.

20. In a fuel system for a combustion engine, two conduits for delivering the working fluid components in two portions, a throttle valve in each of said conduits, and an adjustable passageway for connecting said conduits on the influent sides of said valves, the capacity of said passageway being adapted to remain constant at various degrees of opening of one of said valves.

21. In a fuel system for a combustion engine, two conduits for delivering the working fluid components in two portions, a throttle valve in each of said conduits, a passageway for connecting said conduits on the influent sides of said valves, and means for varying the capacity of said passageway so that it increases concurrently with an increase in the opening of one of said valves.

22. In a fuel system for a combustion engine, means for forming the working fluid in two portions, separate conduits for said portions, an individual throttle valve in each of said conduits, a passageway connecting said conduits on the influent sides of said valves, and means providing for a variable ratio of opening of said valves at a given opening of one of said valves.

23. In a fuel system for a combustion engine, means for forming the working fluid in two portions, a throttle valve for controlling the delivery of one of said portions, a valve for admitting air for the formation of said last-mentioned portion, and a control providing for actuation of both of said valves toward open or closed positions simultaneously.

24. In a fuel system for a combustion engine, means for forming the working fluid in two portions, a throttle valve for controlling the delivery of one of said portions, a valve for admitting air for the formation of said last-mentioned portion, and means providing for actuation of said throttle valve while the other valve remains in a fixed position.

25. In a fuel system for a combustion engine, means for forming the working fluid in two portions, a throttle valve for controlling the delivery of one of said portions, a valve for admitting air for the formation of said last-mentioned portion, and means providing for an adjustably variable rate of decrease of opening of said second valve upon an increase of opening of said throttle valve.

26. In a fuel system for a combustion engine, means for forming the working fluid in two portions, a throttle valve for controlling the delivery of one of said portions, a valve for admitting air for the formation of said last-mentioned portion, and means for maintaining said second valve closed or open any desired predeterminable degree at any given degree of opening of said throttle valve.

27. In a fuel system for a combustion engine, means for forming the working fluid in two portions, a throttle valve for controlling the delivery of one of said portions, a valve for admitting air for the formation of said last-mentioned portion, and a control for actuation of said valves providing for a given ratio of opening of said valves at a given position of said control independently of said ratio at another position of said control.

28. In a fuel system for a combustion engine, two throttle valves for delivering the working fluid components in two portions, and means governed by temperature and atmospheric pressure for adjusting the working fluid mixture strength by varying the ratio of opening of said valves.

29. In a fuel system for a combustion engine, means for delivering the working fluid components in two portions to the combustion chamber inlet passageway, and means for directing said portions into correlative circular motion at said inlet.

30. In a fuel system for a combustion engine, means for temporarily increasing the ratio of fuel to air of the working fluid, for acceleration; a control for adjusting said means, said control being governed by induction suction, for reducing said ratio upon an increase of said suction, and said control being further governed by induction volume, for reducing said ratio upon an increase of said volume.

31. In a fuel system for a combustion engine, a conduit leading from the main air source to the combustion chamber inlet, a choke valve in said conduit, an automatic air valve, and a throttle valve in tandem, a passageway adapted to receive air from said conduit between said choke and air valves, said passageway being adapted to communicate with said conduit between said air and throttle valves, and being adapted to deliver fluid to said conduit between said throttle valve and said inlet; and means for delivering fuel to said passageway between said receiving and communicating points thereof.

32. In a fuel system for a combustion engine, a main air inlet passageway, a choke valve therein, an automatic air valve in said passageway engineward of said choke, a working fluid control governed by pressures encountered in said passageway between said valves, and means for delivering the working fluid components in two portions.

33. In a fuel system for a combustion engine, means for delivering the working fluid components through two conduits, a separate throttle valve in each of said conduits, another valve for transferring fluid from one of said conduits to the other, and means for operating said three valves simultaneously in variable adjustable ratios of change of openings thereof.

34. In a fuel system for a combustion engine, two passageways for forming and delivering the working fluid, an air inlet valve for each of said passageways, a throttle valve for each of said passageways, a fuel supplying aperture in one of said passageways, the end of said last-mentioned passageway on the influent air side of said aperture merging with the influent end of the other passageway into an air conduit; and a choke valve in said conduit.

HOMER A. TRUSSELL.